United States Patent
Kim et al.

(10) Patent No.: US 9,070,913 B2
(45) Date of Patent: Jun. 30, 2015

(54) HUMIDIFIER FOR FUEL CELL

(75) Inventors: Kyoung-Ju Kim, Yongin-si (KR); Yong-Cheol Shin, Seoul (KR); Moo-Seok Lee, Seoul (KR)

(73) Assignee: KOLON INDUSTRIES, INC., Kwacheon-si (KR)

( * ) Notice: Subject to any disclaimer, the term of this patent is extended or adjusted under 35 U.S.C. 154(b) by 304 days.

(21) Appl. No.: 13/516,976

(22) PCT Filed: Mar. 29, 2011

(86) PCT No.: PCT/KR2011/002129
§ 371 (c)(1),
(2), (4) Date: Jun. 18, 2012

(87) PCT Pub. No.: WO2011/122822
PCT Pub. Date: Oct. 6, 2011

(65) Prior Publication Data
US 2012/0270120 A1    Oct. 25, 2012

(30) Foreign Application Priority Data

Mar. 31, 2010 (KR) .................. 10-2010-0029105
Jun. 15, 2010 (KR) .................. 10-2010-0056571
Jan. 21, 2011 (KR) .................. 10-2011-0006305

(51) Int. Cl.
*B01D 63/02*    (2006.01)
*B01D 63/06*    (2006.01)
(Continued)

(52) U.S. Cl.
CPC ...... *H01M 8/04156* (2013.01); *H01M 8/04141* (2013.01); *H01M 2008/1095* (2013.01); *Y02E 60/50* (2013.01); *H01M 8/04149* (2013.01)

(58) Field of Classification Search
CPC .................. H01M 8/04119; H01M 8/04126; F24F 6/04; F24F 6/043; B01D 63/02; B01D 63/04; B01D 63/06; B01D 63/043; B01D 63/046; B01D 5/22; B01D 5/268
USPC ................................. 429/413, 414
See application file for complete search history.

(56) References Cited

U.S. PATENT DOCUMENTS 4,038,190 A      7/1977   Baudet et al.
2001/0015500 A1  8/2001   Shimanuki et al.
(Continued)

FOREIGN PATENT DOCUMENTS

CN    101238606 A   8/2008
EP     2607800 A2   6/2013
(Continued)

OTHER PUBLICATIONS

International Search Report for PCT/KR2011/002129 filed Dec. 19, 2011.
European Patent Office, Communication dated Dec. 22, 2014 issued in counterpart European Application No. 11762994.9.

*Primary Examiner* — Ula C Ruddock
*Assistant Examiner* — Thomas Parsons
(74) *Attorney, Agent, or Firm* — Sughrue Mion, PLLC

(57) ABSTRACT

Disclosed is a humidifier for fuel cell, which facilitates to maximize humidifying performance and reducing the maintenance cost through the uniform humidification among all the hollow fiber membranes by preventing high-humidity unreacted gas introduced to the inside of membrane housing from flowing concentratedly toward a specific region in the membrane housing, wherein the humidifier comprises a membrane housing; a partition plate for dividing an inner space of the membrane housing into plural unit spaces; plural hollow fiber membranes in each of the unit spaces; and a cover mounted on an end of the membrane housing, the cover including an inlet for introducing unreacted gas of high-humidity discharged from a stack into the membrane housing, wherein plural distribution holes are provided in the membrane housing, the distribution holes corresponding to the unit spaces respectively.

5 Claims, 7 Drawing Sheets

(a)

(b)

(51) Int. Cl.
*H01M 8/04* (2006.01)
*H01M 8/10* (2006.01)

(56) References Cited

U.S. PATENT DOCUMENTS

| | | |
|---|---|---|
| 2001/0021467 A1 | 9/2001 | Suzuki et al. |
| 2002/0098395 A1 | 7/2002 | Katagiri et al. |
| 2005/0110172 A1 | 5/2005 | Tanaka et al. |
| 2008/0067700 A1 | 3/2008 | Korytnikov et al. |
| 2008/0079180 A1 | 4/2008 | Kim |
| 2009/0121366 A1 | 5/2009 | Leister et al. |
| 2009/0130495 A1 | 5/2009 | Terasaki et al. |
| 2013/0137005 A1 | 5/2013 | Kim et al. |

FOREIGN PATENT DOCUMENTS

| | | | |
|---|---|---|---|
| JP | 09-299768 A | | 11/1997 |
| JP | 2002-216814 A | | 8/2002 |
| JP | 2002-289229 A | | 10/2002 |
| JP | 2002303435 A | | 10/2002 |
| JP | 200540675 A | | 2/2005 |
| JP | 2005034715 | * | 2/2005 |
| JP | 2006-314890 A | | 11/2006 |
| JP | 20060314890 | * | 11/2006 |
| JP | 2008-103115 A | | 5/2008 |
| JP | 2008-309371 A | | 12/2008 |
| JP | 2010-107069 A | | 5/2010 |

* cited by examiner (a)

(b)

(c)

HUMIDIFIER FOR FUEL CELL

CROSS REFERENCE TO RELATED APPLICATIONS

This application is a National Stage of International Application No. PCT/KR2011/002129 filed on Mar. 29, 2011, which claims priority from Korean Patent Application Nos. 10-2010-0029105 filed Mar. 31, 2010, 10-2010-0056571 filed Jun. 15, 2010 and 10-2011-0006305 filed Jan. 21, 2011, the contents of all of which are incorporated herein by reference in their entirety.

TECHNICAL FIELD

The present invention relates to a humidifier, and more particularly, to a humidifier for fuel cell which facilitates to enhance humidifying performance.

BACKGROUND ART

A fuel cell is an electrochemical cell which generates electricity by combination of hydrogen and oxygen. Unlike a general chemical cell such as a dry cell or storage cell, the fuel cell can generate electricity continuously as long as the necessary hydrogen and oxygen are supplied. In addition, the fuel cell has no heat loss so that efficiency of the fuel cell is twice as high as efficiency of internal combustion engine. Furthermore, since the fuel cell directly converts chemical energy generated by combination of hydrogen and oxygen into electric energy, the fuel cell is eco-friendly, and is capable of being operated without worries about the exhaustion of fossil fuel.

Depending on the type of electrolyte, the fuel cell may be classified into polymer electrolyte fuel cell, phosphoric acid fuel cell, molten carbonate fuel cell, solid oxide fuel cell, and alkaline fuel cell.

One of the most important factors to improve performance of the polymer electrolyte fuel cell is to maintain moisture content by supplying predetermined moisture to polymer electrolyte membrane of membrane-electrode assembly. This is because the generating efficiency is rapidly deteriorated as the polymer electrolyte membrane gets dried.

A method for humidifying the polymer electrolyte membrane is a membrane humidifying method for supplying moisture to dry reaction gas by the use of polymer separation membrane.

The membrane humidifying method uses a membrane which selectively permeates only vapor contained in unreacted gas, to thereby supply the vapor contained in the unreacted gas to the polymer electrolyte membrane. This method is advantageous in that it can manufacture a small-sized humidifier with lightness in weight.

If the selective permeation membrane used for the membrane humidifying method forms a module, it is preferable to use hollow fiber membranes having a large permeation area per unit volume. That is, if fabricating the humidifier with the hollow fiber membranes, the hollow fiber membranes having a large contact surface area can be highly integrated so that the fuel cell is sufficiently humidified even with small volume. In this case, the humidifier with the hollow fiber membranes can be fabricated of a low-priced material. Also, moisture and heat contained in unreacted gas discharged at a high temperature from the fuel cell may be collected and reused in the humidifier.

FIGS. 10 and 11 illustrate a humidifier for fuel cell according to the related art. The humidifier for fuel cell according to the related art comprises a membrane housing 210 in which a plurality of bundles of hollow fiber membranes 270 are integrated to supply moisture to reaction gas flowing through the lumens of the hollow fiber membranes 270; a second inlet 221 for introducing high-humidity unreacted gas; and a second outlet (not shown) for discharging the unreacted gas.

However, in case of the humidifier for fuel cell according to the related art, the high-humidity unreacted gas introduced into the inside of the membrane housing 210 flows concentratedly toward the lowest-pressure region, that is, less-congested region of the hollow fiber membranes 270. Thus, the moisture is smoothly supplied only to the reaction gas flowing through the lumens of the hollow fiber membranes 270 which are brought into sufficient contact with the high-humidity unreacted gas. Meanwhile, the moisture is not supplied to the reaction gas flowing through the lumens of the hollow fiber membranes 270 which are not brought into contact with the high-humidity unreacted gas. Accordingly, the humidifying performance is deteriorated in the humidifier for fuel cell according to the related art. Also, it is difficult to bring the high-humidity unreacted gas into uniform contact with the respective hollow fiber membranes 270 due to the unequal distribution of the high-humidity unreacted gas, which might cause a large difference in contamination level among the hollow fiber membranes 270, whereby a replacement period of the hollow fiber membrane 270 becomes shortened.

DISCLOSURE

Technical Problem

An aspect of the present invention is to provide a humidifier for fuel cell, which prevents high-humidity unreacted gas introduced to the inside of membrane housing from flowing in such a manner that it is unequally distributed in the membrane housing.

Technical Solution

To achieve these objects and other advantages and in accordance with the purpose of the invention, as embodied and broadly described herein, there is provided a humidifier for fuel cell comprising: a membrane housing; a partition plate for dividing an inner space of the membrane housing into plural unit spaces; plural hollow fiber membranes in each of the unit spaces; and a cover mounted on an end of the membrane housing, the cover including an inlet for introducing unreacted gas of high-humidity discharged from a stack into the membrane housing, wherein plural distribution holes are provided in the membrane housing, the distribution holes corresponding to the unit spaces respectively.

Advantageous Effects

According to the humidifier of fuel cell of the present invention, the high-humidity unreacted gas is brought into uniform contact with all hollow fiber membranes inside the humidifier, which enables to uniformly humidify all reaction gas passing through the hollow fiber membranes inside the humidifier. Thus, the humidifier for fuel cell according to the present invention enables the improved humidifying efficiency.

Also, the high-humidity unreacted gas is uniformly supplied to all hollow fiber membranes inside the humidifier, so that it is possible to prevent a large difference in contamination level among hollow fiber membranes, to thereby allow an extended replacement period of the hollow fiber membranes.

BEST MODE

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Analysis shows that an unequal distribution of high-humidity unreacted gas introduced into the inside of membrane housing results from the following two factors.

The first factor is a channeling phenomenon caused by an unequal geographical distribution among hollow fiber membranes. This channeling phenomenon occurs inevitably during a process for potting the hollow fiber membranes into the membrane housing. That is, during the process for potting the hollow fiber membranes, there may be less-congested region and highly-congested region of the hollow fiber membranes 220 due to the imbalanced force applied. Accordingly, while the high-humidity unreacted gas flows concentratedly through the less-congested region of the hollow fiber membranes 220, the high-humidity unreacted gas does not flows through the highly-congested region of the hollow fiber membranes 220, whereby the humidifying performance is deteriorated considerably.

The second factor is a position of outlet for discharging the unreacted gas. Most of the humidifiers for fuel cell are formed in such a manner that their inlet and output are positioned depending on a system structure. Even though the high-humidity unreacted gas is equally distributed to the inside of the membrane housing via the inlet, there may be a pressure difference due to the outlet slanted to a specific side, which causes the unequally distributed gas flow. Thus, the hollow fiber membrane being apart from the outlet is insufficiently humidified due to the pressure difference, thereby deteriorating the humidifying efficiency.

An aspect of the present invention is to provide a humidifier for fuel cell, which facilitates to enhance the humidifying efficiency by preventing the improper flow of the unreacted gas inside the membrane housing, which will be explained as follows.

Hereinafter, a humidifier for fuel cell according to the present invention will be described with reference to the accompanying drawings.

Figure 1:
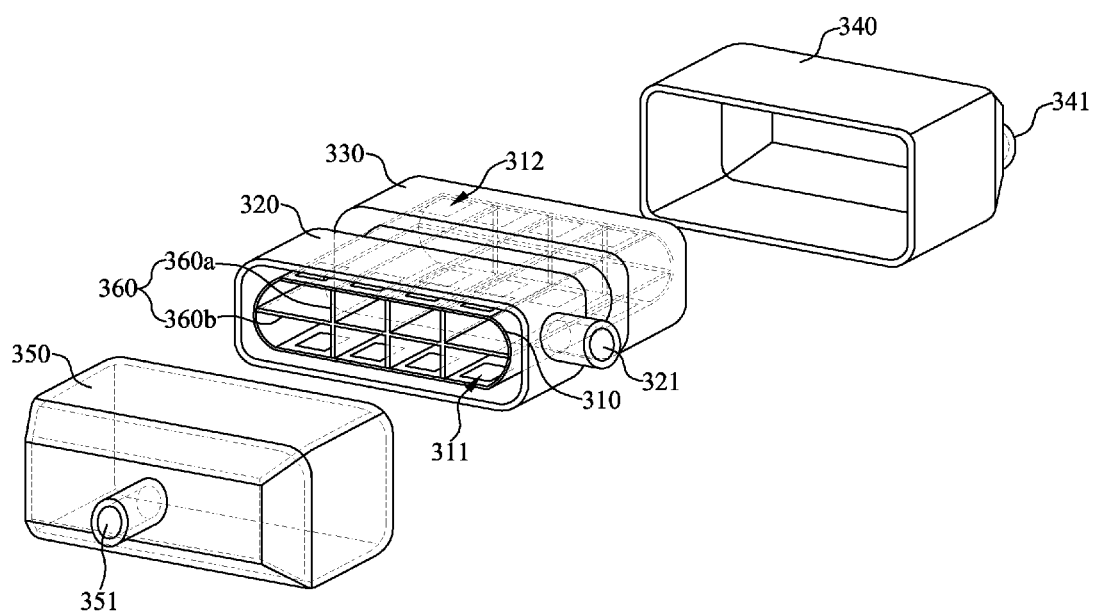
FIG. 1 is an exploded perspective view illustrating a humidifier for fuel cell according to one embodiment of the present invention.

FIG. 1 is an exploded perspective view illustrating a humidifier for fuel cell according to one embodiment of the present invention.

As shown in FIG. 1, the humidifier for fuel cell according to one embodiment of the present invention comprises a membrane housing 310 with first and second ends. At the first end of the membrane housing 310, there are distribution holes 311. At the second end positioned opposite to the first end, there are discharge holes 312. Also, a predetermined empty space is formed inside the membrane housing 310. This inner space of the membrane housing 310 enables to integrate hollow fiber membranes 370 therein. For supplying high-humidity unreacted gas to the hollow fiber membranes 370 integrated inside the membrane housing 310, the plural distribution holes 311 are formed in lower and upper portions of the first end of the membrane housing 310. After the moisture contained in the unreacted gas is supplied to the hollow fiber membranes 370, the dry unreacted gas is discharged to the outside via the plural discharge holes 312 in lower and upper portions of the second end of the membrane housing 310.

Both ends of the hollow fiber membrane 370 are respectively potted into the both ends of the membrane housing 310. Both ends of the hollow fiber membrane 370 remain open so that fluid outside the membrane housing 310 flows through the hollow of the hollow fiber membrane 370. Also, since both ends of the membrane housing 310 are potted, the fluid flows into and flows out from the membrane housing 310 only via the distribution holes 311 and the discharge holes 312. Also, the hollow fiber membrane 370 has a pore with a predetermined diameter, whereby the pore of the hollow fiber membrane 370 selectively admits the moisture from the high-humidify unreacted gas flowing outside the hollow fiber membrane 370 to the inside of the hollow fiber membrane 370.

The first end of the membrane housing 310 is covered with a first cover 320. The first cover 320 is provided with a second inlet 321 for introducing the high-humidity unreacted gas discharged from the stack. While the high-humidity unreacted gas introduced via the second inlet 321 flows outside the membrane housing 310, the high-humidity unreacted gas flows into the inside of the membrane housing 310 via the distribution hole 311. A sealing portion (not shown) is provided between an inner surface of the first cover 320 and the first end of the membrane housing 310, whereby the high-humidity unreacted gas flows only into the inside of the membrane housing 310 through the plural distribution holes 311. That is, according as the second inlet 321 of the first cover 320 is provided in communication only with the plural distribution holes 311, the high-humidity unreacted gas introduced via the second inlet 321 flows into the inside of the membrane housing 310 only via the plural distribution holes 311.

Figure 10:
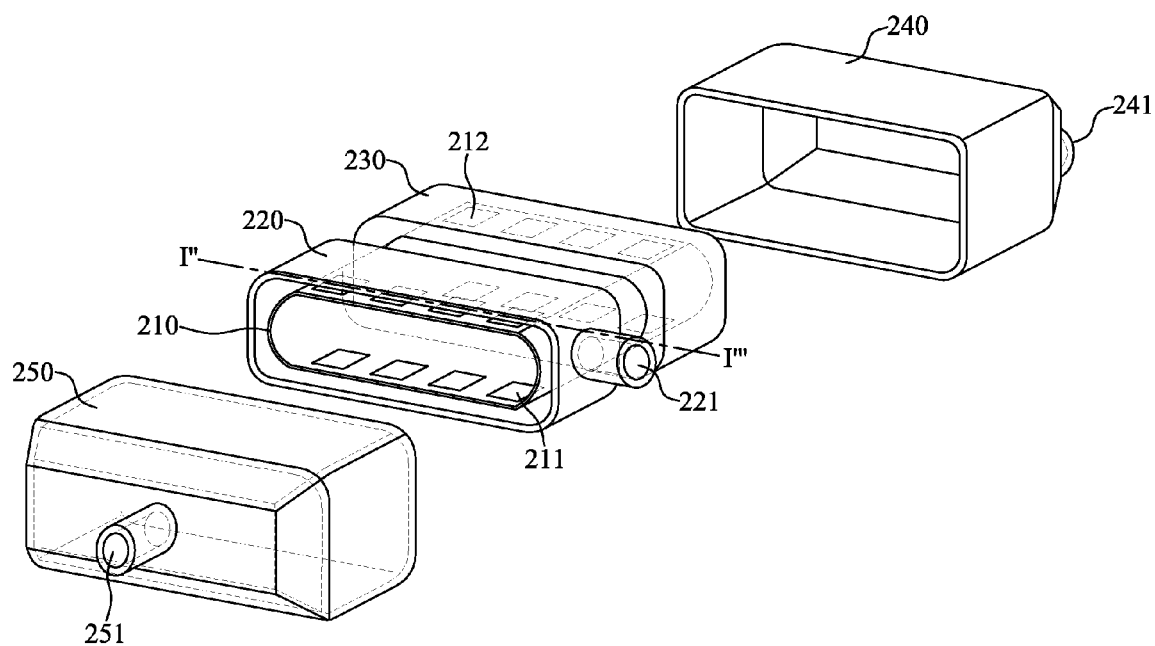
FIG. 10 is an exploded perspective view illustrating a humidifier for fuel cell according to the related art.
Figure 11:
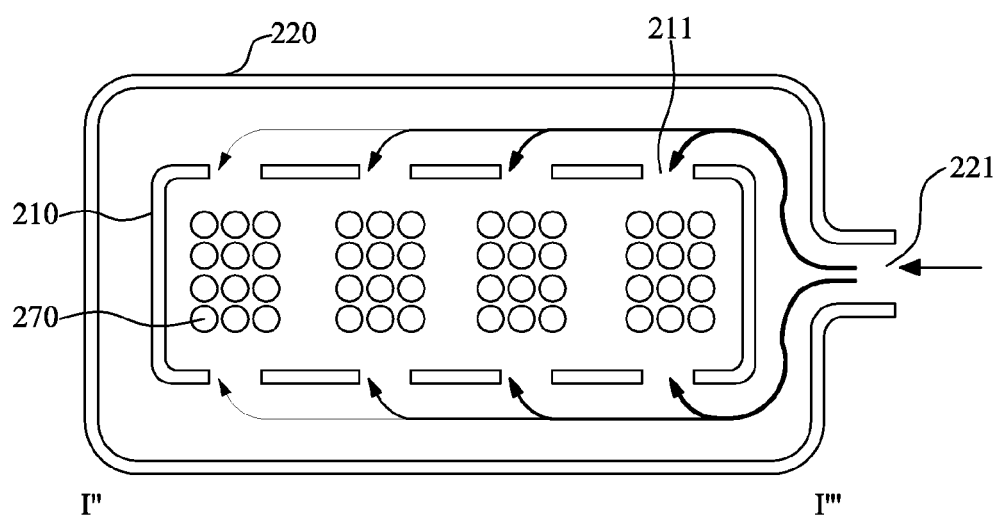
FIG. 11 is a cross section view along I-I' of FIG. 10.

In the related art with reference to FIGS. 10 and 11, the high-humidity unreacted gas flows concentratedly through the less-congested region of the hollow fiber membranes 270, whereby the humidifying efficiency is deteriorated. Also, there may be the pressure difference due to the outlet slanted to the specific side, which causes the unequally distributed gas flow. Thus, the hollow fiber membrane being apart from the outlet is insufficiently humidified due to the pressure difference, thereby deteriorating the humidifying efficiency.

However, the humidifier for fuel cell according to the present invention includes a partition plate 360 provided inside the membrane housing 310. Owing to the partition plate 360, the inside of the membrane housing 310 is divided into a plurality of unit spaces. The hollow fiber membranes 370 are grouped and integrated in the respective unit spaces. That is, each unit space functions as a humidifier.

The high-humidity unreacted gas is introduced into the respective unit spaces via the plural distribution holes 311 at the first end of the membrane housing 310. Before the introduced high-humidity unreacted gas is discharged via the discharge holes 312 at the second end of the membrane housing 310, the high-humidity unreacted gas remains in the respective unit spaces. Accordingly, even though the congestion difference among the hollow fiber membranes 370 inside the membrane housing 310, and the pressure difference in the membrane housing 310 occur in the humidifier for fuel cell according to the present invention; the introduced high-humidity unreacted gas flows uniformly through the respective unit spaces, whereby the hollow fiber membranes 370 are uniformly supplied with moisture and heat, thereby maximizing the humidifying efficiency.

A thickness of the partition plate 360 is 1~10 times larger than an average diameter of the hollow fiber membranes 370. If the partition plate 360 is too thin, it cannot be used for a long time due to deterioration in durability. Meanwhile, if the partition plate 360 is too thick, economical efficiency is considerably lowered due to deterioration in integration efficiency.

Figure 2:
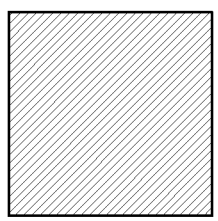
FIG. 2 is a plane view illustrating various examples of partition plate according to one embodiment of the present invention.
Figure 2:
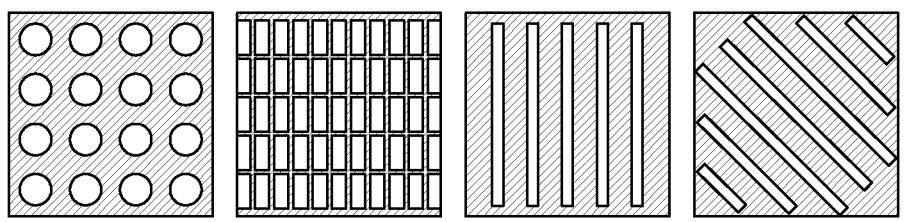
Figure 2:
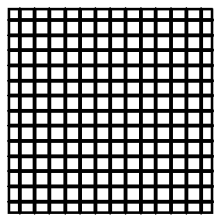

FIG. 2 is a plane view illustrating the partition plate according to one embodiment of the present invention.

As shown in FIG. 2, the partition plate 360 may be a closed type without a through-hole. If the closed-type partition plate 360 is formed in the membrane housing 310, the supplied unreacted gas flows only through the respective unit spaces.

The through-hole of the partition plate 360 may vary in shape, for example, hole type or mesh type, wherein the hole type may be at least one among a circular hole, an oval-shaped hole, a polygon-shaped hole, a slit hole, and an oblique slit. However, the through-hole of the partition plate 360 is not limited to these shapes.

If the through-hole is formed in the partition plate 360, the respective unit spaces are connected by the through-hole, whereby the unreacted gas flows through the plurality of unit spaces instead of remaining in each unit space. Accordingly, it is possible to prevent the unreacted gas from flowing through and remaining in only some of the unit spaces inside the membrane housing 310.

In order to prevent the unequally distributed gas flow in the membrane housing 310, it is desirable that the number of unit spaces divided by the partition plate 360 be as large as possible. However, in consideration to the manufacturing process and cost of the membrane housing 310, the membrane housing 310 includes 2~9 unit spaces, preferably.

As shown in FIG. 1, the partition plate 360 may comprise first plate 360a or second plate 360b. The first plate 360a and second plate 360b may be perpendicular to each other.

Figure 3:
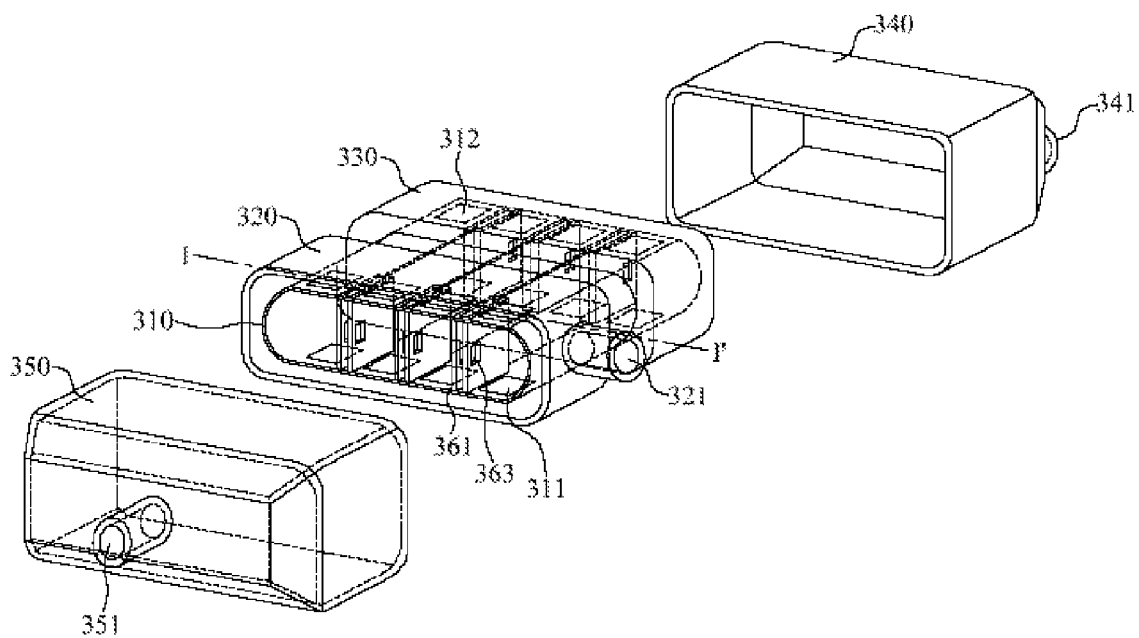
FIG. 3 is an exploded perspective view illustrating a humidifier for fuel cell according to another embodiment of the present invention.
Figure 4:
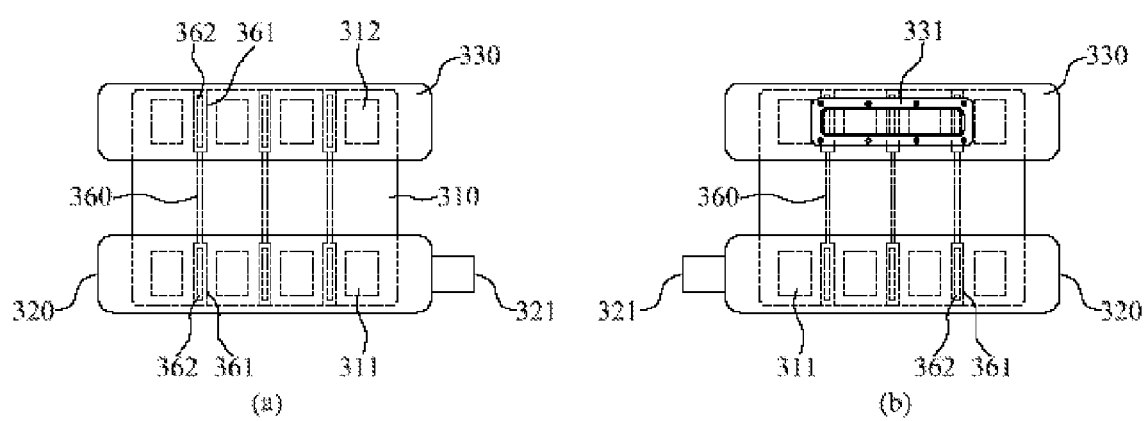
FIG. 4 shows plane and rear views of the membrane housing illustrated in FIG. 3, wherein (a) is a plane view of membrane housing in FIG. 3, and (b) is a rear view of membrane housing in FIG. 3.
Figure 5:
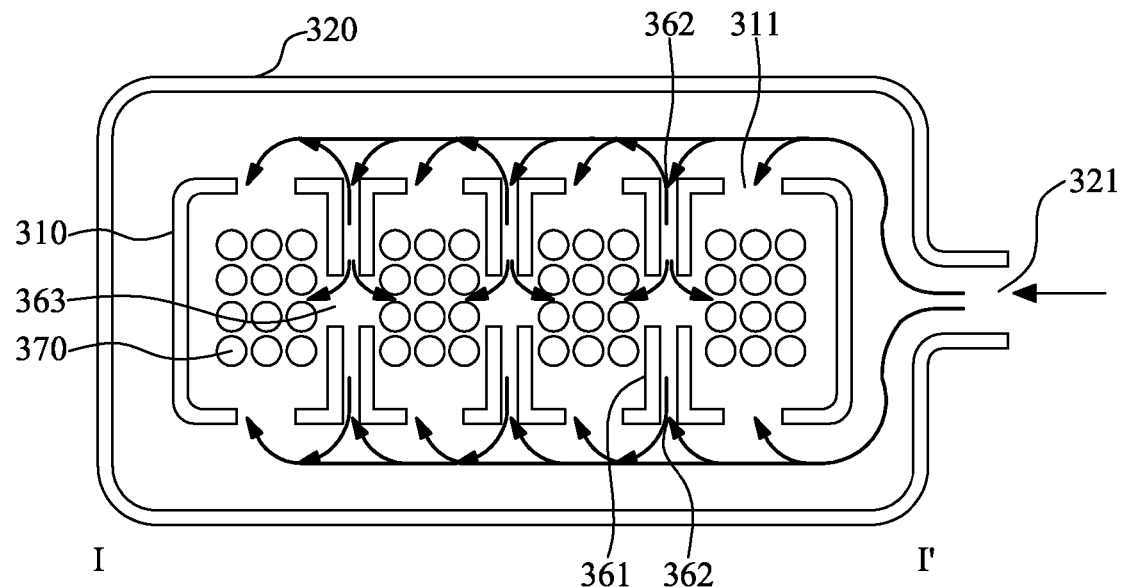
FIG. 5 is a cross section view along I-I of FIG. 3.

FIG. 3 is an exploded perspective view illustrating a humidifier for fuel cell according to another embodiment of the present invention. FIG. 4(a) is a plane view of membrane housing in FIG. 3, and FIG. 4(b) is a rear view of membrane housing in FIG. 3. FIG. 5 is a cross section view along I-I of FIG. 3.

A double partition 361 may be formed in at least a portion of the partition plate 360. For example, as shown in FIGS. 3 to 5, the double partitions 361 may be formed at both ends of the partition plate 360. If the partition plate 360 whose both ends are formed of the double partitions 361 is provided inside the membrane housing 310, a sealing element may be provided at the end of the double partition 361 so as to prevent the gas penetration.

A window 363 may be formed in at least one of the double partitions 361. Owing to the window 363, the inner space of the double partition 361 is provided in communication with the respective unit spaces inside the membrane housing 310. The window 363 provided in the double partition 361 enables the free flow of the high-humidity unreacted gas through the inner space of the double partition 361 and the respective unit spaces inside the membrane housing 310. Accordingly, the high-humidity unreacted gas flows uniformly through the entire regions of the membrane housing 310 without flowing concentratedly in some regions of the membrane housing 310.

Figure 6:
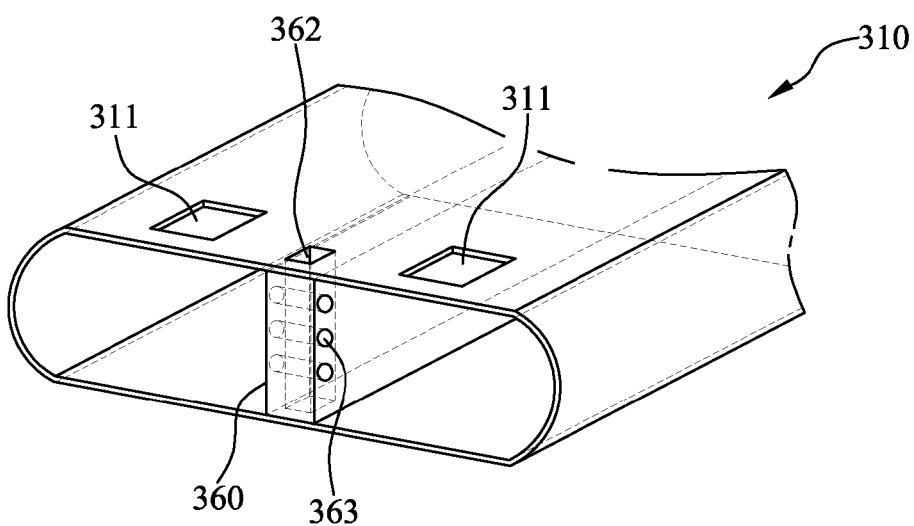
FIG. 6 is a perspective view illustrating a membrane housing with a partition plate according to another embodiment of the present invention.

FIG. 6 is a perspective view illustrating a membrane housing with a partition plate according to another embodiment of the present invention. As shown in FIG. 6, first and second holes are formed in respective portions being in contact with the partition plate 360 of the membrane housing 310, wherein the first and second holes confront each other with the partition plate 360 interposed therebetween. To connect the first and second holes to each other, a pass-through passage 362 may be formed inside the partition plate 360. Owing to the pass-through passage 362 of the partition plate 360, and the first and second holes connected with the pass-through passage 362; the high-humidity unreacted gas flows freely through the lower and upper parts of the membrane housing 310. Thus, the high-humidity unreacted gas may flow uniformly through the entire regions outside the membrane housing 310. For example, if the high-humidity unreacted gas is excessive in the upper part of the membrane housing 310, the high-humidity unreacted gas flows toward the lower part of the membrane housing 310 via the pass-through passage 362 connected with the first and second holes of the membrane housing 310, whereby the high-humidity unreacted gas flows uniformly through the entire regions of the membrane housing 310.

As shown in FIGS. 3 to 5, the pass-through passage 362 is formed through the inside of the double partition 361. Owing to the pass-through passage 362 of the double partition 362, the high-humidity unreacted gas flows more freely through the lower and upper parts of the membrane housing 310. Accordingly, the high-humidity unreacted gas may flow more uniformly through the entire regions outside the membrane housing 310.

A window 363 may be formed in the partition plate 360, wherein the pass-through passage 362 is provided in communication with the unit spaces by the use of window 363. The window 363 provided in the partition plate 360 enables the free flow of the high-humidity unreacted gas through the respective unit spaces inside the membrane housing 310. Accordingly, the high-humidity unreacted gas flows more uniformly through the entire regions of the membrane housing 310.

Figure 7:
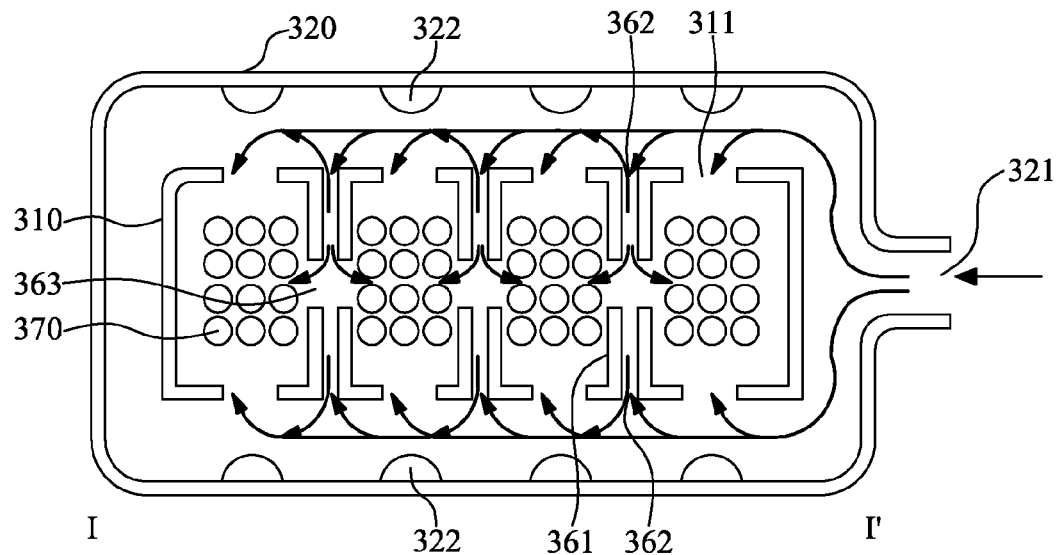
FIG. 7 is a cross section view along I-I of FIG. 3 according to another embodiment of the present invention.

FIG. 7 is a cross section view along I-I of FIG. 3 according to another embodiment of the present invention. In case of the related art, as shown in FIGS. 10 and 11, the high-humidity unreacted gas flows concentratedly through the distribution hole 211 positioned near to the second inlet 221, thereby deteriorating the humidifying performance, and causing the large difference in contamination level among the hollow fiber membranes 270.

However, as shown in FIG. 7, the humidifier according to the present invention may comprise protrusions 322 on the inner surface of the first cover 320. The protrusions 322 hinder the high-humidity unreacted gas introduced via the second inlet 321 from flowing straightly, to thereby prevent the high-humidity unreacted gas from flowing concentratedly only through the distribution hole 211 positioned near to the second inlet 221. That is, the high-humidity unreacted gas flows uniformly through the entire regions outside the membrane housing 310, whereby the high-humidity unreacted gas is uniformly supplied to the entire inside of the membrane housing 310. Accordingly, the respective hollow fiber membranes 370 integrated inside the membrane housing 310 are uniformly supplied with the moisture, thereby improving the humidifying performance, and preventing the large difference in contamination level among the hollow fiber membranes 370.

The protrusion 322 is not limited to a specific shape. For example, the protrusion 322 may be formed in a curved shape such as a circular cylinder, a hemisphere, or a circular cone with a curved vertex; or may be formed in an angular shape such as a poly pyramid, a circular cone, or a poly pillar. Preferably, the protrusion 322 is formed in a streamline shape enabling to make eddy with easiness and causing no hindrance to the gas flow.

The protrusion 322 is positioned above the distribution hole 311, to thereby effectively prevent the unequally distributed flow of the unreacted gas. The plurality of protrusions 322 may be appropriately formed on the inner surface of the first cover 320. Preferably, the protrusions 322 may be arranged in one-to-one correspondence with the distribution holes 311, which enables to flow the high-humidity unreacted gas uniformly through the respective distribution holes 311.

Figure 8:
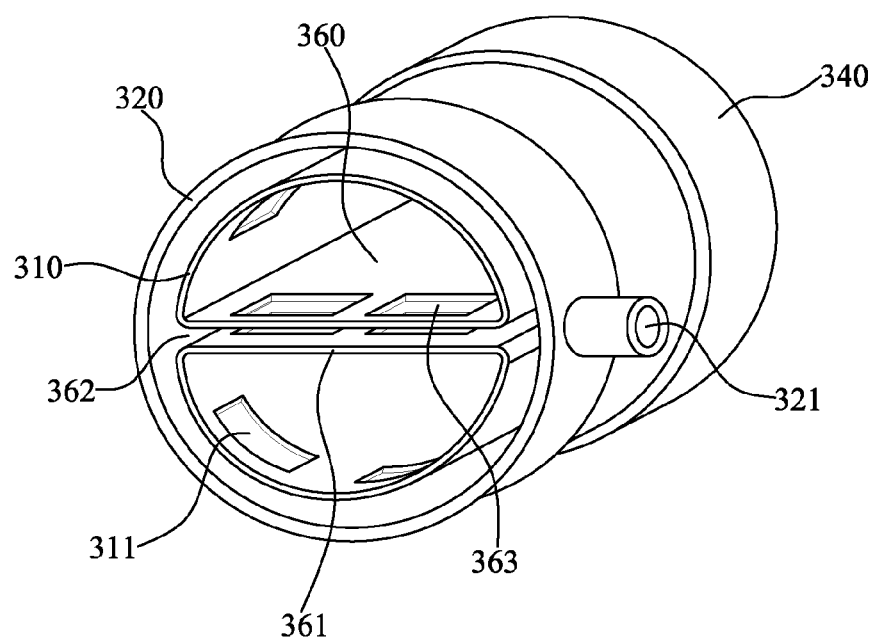
FIGS. 8 and 9 are perspective views illustrating membrane housings according to another embodiment of the present invention.
Figure 9:
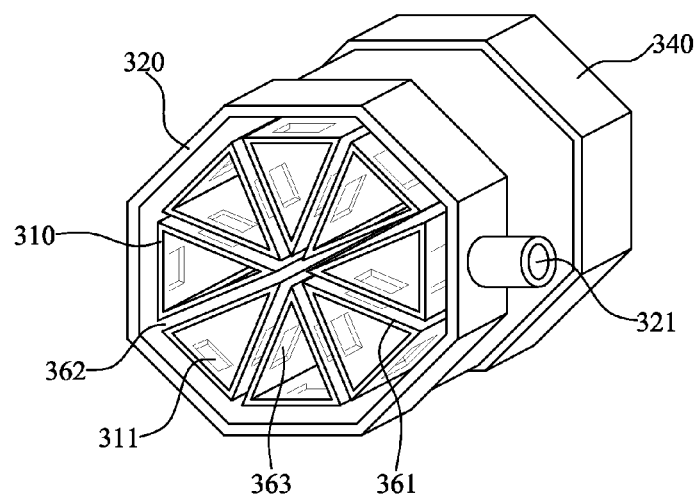

FIGS. 8 and 9 are perspective views illustrating the membrane housing 310 according to another embodiment of the present invention. The humidifier for fuel cell according to the present invention may include the membrane housing 310 shaped in a circular cylinder of FIG. 8, or the membrane housing 310 shaped in an octagonal pillar of FIG. 9. Especially, in case of the humidifier for fuel cell which has the polygonal cross section, as shown in FIG. 9, a double partition 361 and pass-through passage 362 are formed in each side of the polygonal shape; and a window 363 is formed in each double partition 361, whereby the high-humidity unreacted gas flows uniformly through the entire inside of the membrane housing 310.

The above humidifier for fuel cell may be formed in various poly-pyramid shapes, for example, a triangular pyramid, a pentagonal pyramid, or a hexagonal pyramid; or may be formed in an oval-shaped cylinder, however, it is not limited to these shapes.

At a second end of the membrane housing 310, there is a second cover 330 which includes a second outlet 331 for discharging the dry unreacted gas to the outside. The second outlet 331 may be formed at the lower side of the second cover 330, and the second outlet 331 may be shaped in the rectangle.

A sealing element (not shown) is installed between the inner surface of the second cover 330 and the second end of the membrane housing 310, whereby the dry unreacted gas is discharged only via the second outlet 331.

The end of the first cover 320 is covered with a first cap 350 including a first outlet 351. Herein, reaction gas supplied with the moisture from the hollow fiber membrane 370 is discharged via the first outlet 351, and is then supplied to the fuel cell.

The end of the second cover 330 is covered with a second cap 340 including a first inlet 341. The reaction gas is introduced via the first inlet 341.

An operation of the humidifier for fuel cell according to one embodiment of the present invention will be described in detail as follows.

While the reaction gas to be supplied to the fuel cell flows into the humidifier via the first inlet 341, the high-humidity unreacted gas discharged from the stack flows into the inside of the first cover 320 via the second inlet 321. The introduced high-humidity unreacted gas collides with the protrusions 322, whereby the high-humidity unreacted gas flows uniformly into the inside of the membrane housing 310 via the distribution holes 311.

The high-humidity unreacted gas flows through the inside of the double partition 361 via the pass-through passage 362 connected with the first and second holes of the membrane housing 310. Also, the high-humidity unreacted gas flows freely through the respective unit spaces inside the membrane housing 310 via the window 363 provided in each side of the double partition 361, whereby the high-humidity unreacted gas flows uniformly through the entire regions of the membrane housing 310.

The reaction gas introduced via the first inlet 341 flows through the hollow of the hollow fiber membrane 370, and then the flowing reaction gas is supplied to the fuel cell via the first outlet 351. The reaction gas introduced via the first inlet 341 is in the dry state. However, since the unreacted gas introduced into the inside of the membrane housing 310 contains a large amount of moisture, there is the humidity difference between the inside of the hollow fiber membrane 370 and the outside of the hollow fiber membrane 370. Due to the humidity difference between the inside of the hollow fiber membrane 370 and the outside of the hollow fiber membrane 370, the moisture of the unreacted gas selectively permeates through the hollow fiber membrane 370, and then the moisture is supplied to the reaction gas flowing through the hollow of the hollow fiber membrane 370.

According as the moisture of the unreacted gas is supplied to the reaction gas through the use of hollow fiber membrane 370, the unreacted gas is gradually dried. Then, the dry unreacted gas is discharged to the outside of the humidifier via the plural discharge holes 312 and the second outlet 331.

Eventually, based on the above method, the fuel cell is supplied with the reaction gas whose humidity becomes higher than its original state.

According to the humidifier for fuel cell according to the present invention, the unreacted gas containing the moisture is uniformly supplied to the hollow fiber membranes 370 inside the humidifier, which enables to maintain the similar contamination level among the hollow fiber membranes 370. Thus, a replacement period of the hollow fiber membrane 370 is extended by a contamination delay in the hollow fiber membrane 370, thereby reducing the maintenance cost of the humidifier.

The invention claimed is:
1. A humidifier for fuel cell comprising:
a membrane housing;
a partition plate for dividing an inner space of the membrane housing into plural unit spaces;
plural hollow fiber membranes in each of the unit spaces, each of the hollow fiber membranes disposed in only the unit space corresponding thereto; and a cover mounted on an end of the membrane housing, the cover including an inlet for introducing unreacted gas of high-humidity discharged from a stack into the membrane housing, wherein plural distribution holes are provided in the membrane housing, the distribution holes corresponding to the unit spaces respectively, wherein first and second holes are formed in respective portions of the membrane housing, the portions being in contact with the partition plate, and the first and second holes confront each other with the partition plate interposed therebetween, wherein the partition plate has a double partition structure having a pass-through passage thereinside such that the first and second holes are in fluid communication with each other, and wherein at least one partition of the double partition structure is provided with a window enabling the pass-through passage and the unit space to be in fluid communication with each other such that the unreacted gas of high-humidity introduced into the pass-through passage via the first and second holes can be distributed to the unit space via the window.

2. The humidifier for fuel cell according to claim 1, wherein the partition plate includes first and second sub-plates, and the first and second sub-plates cross each other.

3. The humidifier for fuel cell according to claim 1, wherein each partition of the double partition structure are provided with the window so that the unit spaces are in fluid communication with one another.

4. The humidifier for fuel cell according to claim 1, wherein plural protrusions are formed on the inner surface of the cover so as to uniformly distribute the unreacted gas introduced via the inlet of the cover into the respective unit spaces.

5. The humidifier for fuel cell according to claim 1, wherein a thickness of the partition plate is 1~10 times larger than an average diameter of the hollow fiber membranes.

* * * * *